United States Patent
Manning

Patent Number: 5,118,131
Date of Patent: Jun. 2, 1992

[54] SUSPENSION

[75] Inventor: Donald L. Manning, Orchard Lake, Mich.

[73] Assignee: DLMA Transportation Inc., Troy, Mich.

[21] Appl. No.: 660,959

[22] Filed: Feb. 26, 1991

[51] Int. Cl.$^5$ .................. B60G 11/14; B60G 11/26; B60G 9/02
[52] U.S. Cl. .................. 280/713; 280/725
[58] Field of Search .................. 280/111, 112.1, 702, 280/705, 711, 712, 713, 716, 725, 688

[56] References Cited

U.S. PATENT DOCUMENTS

| | | | |
|---|---|---|---|
| 3,482,854 | 12/1969 | Masser | 280/713 |
| 4,293,145 | 10/1981 | Taylor | 280/711 |
| 4,371,190 | 2/1983 | Vandenberg | 280/705 |
| 4,415,179 | 11/1983 | Marinelli | 280/713 |
| 4,422,667 | 12/1983 | Perry | 280/705 |
| 4,718,692 | 1/1988 | Raidel | 280/711 |
| 4,722,549 | 2/1988 | Raidel | 280/688 |

FOREIGN PATENT DOCUMENTS 2629530  1/1978  Fed. Rep. of Germany ...... 280/711

Primary Examiner—Charles A. Marmor
Assistant Examiner—Tamara L. Graysay
Attorney, Agent, or Firm—Reising, Ethington, Barnard, Perry & Milton

[57] ABSTRACT

The invention relates to a vehicle suspension system of the type wherein one end of a suspension is articulated to a chassis or vehicle body so that the axle end of the suspension is able to move vertically relative to the chassis through intermediate springs and, more specifically, wherein the sole means of articulation of the suspension to the chassis is through a pair of laterally spaced and longitudinally extending radius rods or bushed suspension arms and which suspension is able to flex to accommodate limited relative vertical movement of the wheels supported by the suspension.

4 Claims, 2 Drawing Sheets

SUSPENSION

TECHNICAL FIELD

The subject matter of the present invention relates to a vehicle suspension of the type wherein the suspension is articulated to a chassis in such a way that there can be relative vertical movement between the chassis and the free end of the suspension through intermediate spring means. More specifically, the invention relates to a suspension system wherein the chassis includes a pair of laterally spaced longitudinal beams interconnected by a plurality of transverse beams and to one of which transverse beams the suspension is articulated. The suspension includes an axle and some type of longitudinally extending bushed suspension arms or rods through which the suspension is articulated to the chassis beams or other supporting structure. Such arrangement permits relative vertical movement between the chassis and the suspension about the points of articulation of the suspension to the chassis. With a suspension articulated at one end to a chassis, there is not only vertical movement between the chassis and suspension but there is also a tendency under certain driving conditions for the free or unarticulated end of the suspension, including the axle, to be subjected to forces tending to create undesired lateral movement of the suspension relative to the chassis or body support structure. The typical way of preventing such lateral movement of the suspension is to utilize Panhard links or rods, Watts linkages or various combinations of transversely disposed radius rods connected between the free end of the suspension and the chassis. Sometimes a combination of the foregoing elements are utilized to prevent or limit such lateral movement. It is not uncommon to utilize four or more variously positioned radius rods between the chassis and the subadjacent suspension to articulate the suspension to limit both longitudinal and lateral movement of the suspension relative to the chassis.

Particularly with respect to suspensions utilized with buses and trucks, a continuous effort is underway to reduce vehicle weight both as a means of saving cost and improving fuel economy. Thus, the present invention relates to a greatly simplified system for articulating a suspension to a chassis and, more specifically, one in which the entire of articulation the suspension to the chassis is achieved with two rods or suspension arms which are mounted in such a way as to limit or eliminate lateral movement of the suspension relating to the chassis without the need for additional rods or linkages.

BACKGROUND ART

Applicant is unaware of any such suspension system wherein the suspension is articulated to the chassis through a pair of bushed suspension arms or radius rods which not only accommodate relative vertical movement between the chassis and suspension but which also prevent relative lateral movement between the suspension and the chassis in a manner to avoid the use of additional linkage members and further wherein the suspension can allow limited flexing or twisting to accommodate relative vertical movement or jounce between the wheels supported by the suspension.

DISCLOSURE OF THE INVENTION

The subject matter of the invention relates to a chassis or body supported suspension of the type wherein the chassis includes a pair of laterally spaced longitudinally extending beams, a transverse beam integrally joined to the longitudinal beams, a suspension articulated to the chassis and a plurality of spring members disposed between the chassis and the suspension to resiliently accommodate relative vertical movement between the free end of the suspension and the chassis. More specifically, the suspension comprises an axle extending transversely outboard of the longitudinal beams, bracket members respectively secured to the chassis at the junctions of the longitudinal beams and the transverse beam and extending below the longitudinal beams. The axle is connected to the chassis through a pair of longitudinally extending radius rods or suspension arms each of which includes a journal bearing at one end thereof and bolt means extending through the bracket members and the journal bearings to articulate the radius rod or arm to the chassis in such a way that each rod or arm may rotate about its associated bolt means in a vertical plane passing through the superadjacent longitudinal beam. The end portion of each radius rod or arm opposite from the journal bearing is suitably joined to the axle in a manner that the axle and radius rods or arms can rotate as a unit about the journal bearings while at the same time opposing lateral movement of the free end of the suspension relative to the chassis. At the same time the support arms or rods are so constructed and arranged as to allow limited flexure or twisting of the suspension to accommodate relative jounce or vertical movement between the wheels supported by the suspension.

The details of the invention are set forth in the drawings and the description which follows.

BEST MODE FOR CARRYING OUT THE INVENTION

Figure 1:
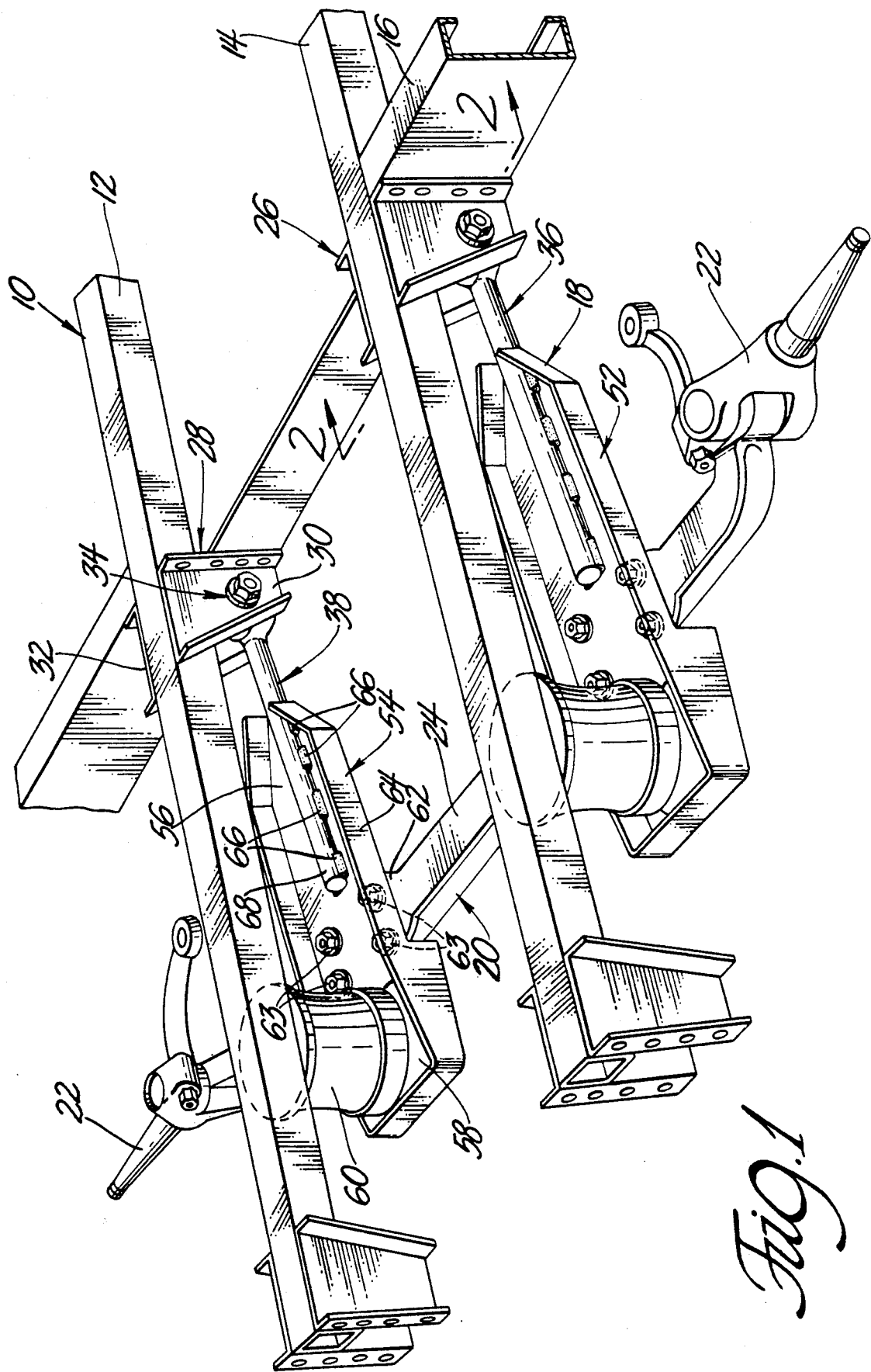
FIG. 1 is a perspective view of the invention showing the way in which the suspension is articulated to the chassis.

The invention is illustrated and described with a chassis upon which a vehicle body, not shown, is adapted to be supported. It is to be understood that the suspension of the present invention may also be utilized with a unitized or monocoque body design. A chassis is indicated generally at 10 and includes a pair of longitudinally extending and laterally spaced beams 12 and 14. The longitudinal beams are interconnected by a plurality of transverse beams 16 only one of which is shown.

A suspension is indicated generally at 18 and includes a transversely extending front axle 20 disposed parallel to and longitudinally spaced from transverse beam 16. While illustrated as a front suspension, the inventive principles apply just as well to a rear suspension. The outer ends of axle 20 extend laterally beyond the transverse beams 12 and 14 and, in the illustrated version, have suitable steerable wheel spindles 22 pivotally connected thereto. Axle 20 includes a flat upper surface 24.

Brackets 26 and 28 are fixed to the chassis at the junctions of the longitudinal and transverse beams. In the case of a unitized or monocoque body, the brackets would be supported and depend therefrom Since the brackets are identical only one will be described in detail. More specifically, bracket 28 consists of a pair of flanged plate members 30 and 32 disposed on laterally opposite sides of longitudinal beam 12 and suitably secured thereto either through welding or bolt means. Plate members 30 and 32 project below longitudinal beam 12 Plate member 28 is also suitably secured to the transverse beam 16 and project vertically below longitudinal beam 12. As will be described in greater detail below, a pair of laterally aligned holes are fomred through that portion of the plates 30 and 32 below longitudinal beam 12 and are adapted to receive suitable bolt means 34.

Figure 2:
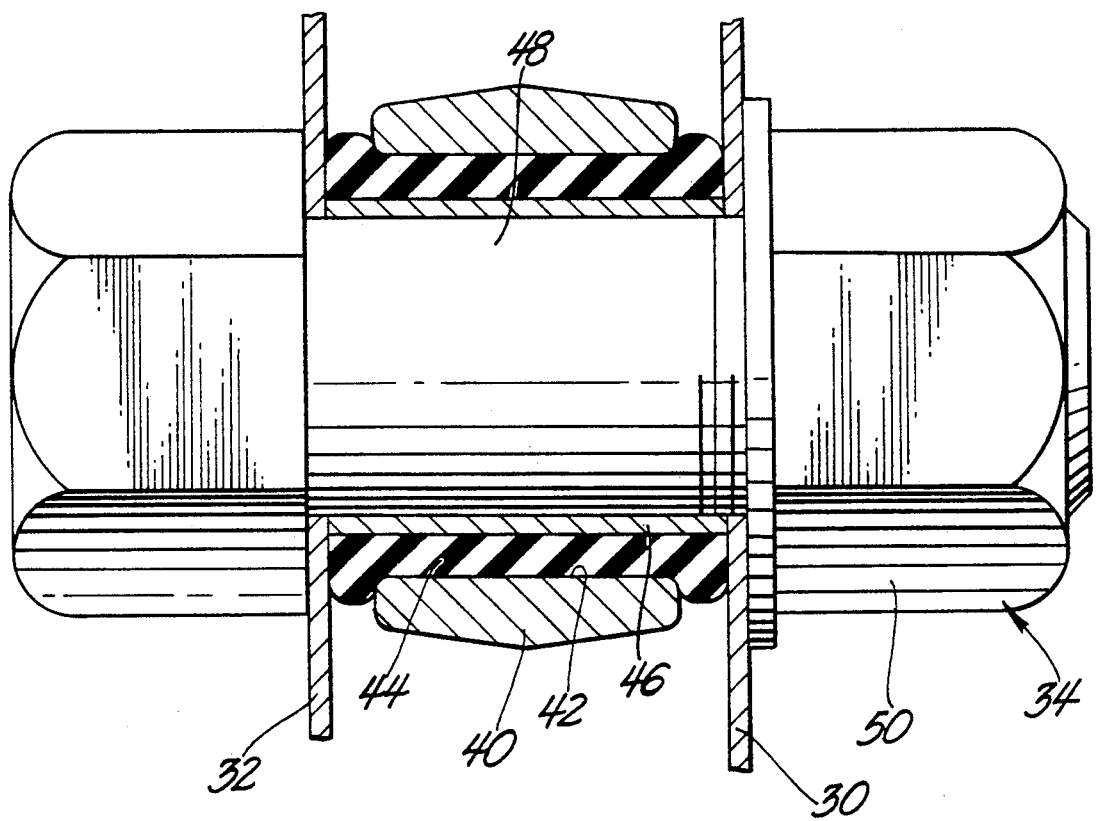
FIG. 2 is a sectional view through line 2—2 of FIG. 1.

A pair of identical suspension arms or radius rods are indicated generally at 36 and 38 again only one of which will be described in detail. Rod 38 includes an enlarged end 40 having a journal bearing disposed therein. More specifically referring to FIG. 2, the enlarged end 40 of the radius rod has a transverse hole 42 formed therethrough which is adapted to receive an elastomeric cylindrical sleeve 44 into the inner diameter of which a metal journal sleeve 46 is press fitted. The bolt means 34 includes a bolt member 48 adapted to project through the bracket plates 30 and 32 and radius rod journal sleeve 46 and to rotatably secure the radius rod to the bracket through a suitable nut element 50.

That portion 68 of the radius rod longitudinally spaced from the journal bearing end thereof is adapted to be secured to the axle in such a way that there can be relative vertical movement between the axle and the superadjacent longitudinal beams or body with such movement occurring due to the rotative movement of the radius rods about the associated bracket members. It is obvious that the radius rods must be formed of a material and be of a size as to withstand the loads transmitted between the chassis and the suspension in a way as not to bend. It is found that the rods can satisfactorily be made of a forged stainless steel and have diameters or cross sections of a size to accommodate particular vehicle sizes and weights.

In order to provide sufficient surface over which the rod or arm is secured to the axle, to provide a means for easy disassembly/servicing of the suspension and to permit limited flexure or twisting of the suspension to accommodate individual wheel jounce, it is preferred to secure the rods 36 and 38 to axle 20 through elongated plates 52 and 54. Again, inasmuch as they are identical, only one plate will be described in detail. Plate 54 includes a first elongated portion 56 extending longitudinally into the space between the axle 20 and transverse beam 16. Plate 54 includes a second portion 58 extending longitudinally on the opposite side of axle 20 and is adapted to provide a suitable support for a spring member 60 disposed between the plate and the superadjacent longitudinal beam 12. It is to be further noted that plate 54 is longitudinally aligned with and subadjacent to longitudinal beam 12 and coacting support bracket 28. Again in the preferred form, the upper surface 24 of axle 20 is flat and includes a somewhat enlarged flange portion 62 through which suitable bolt means 63 extend and by which plate 54 is secured to the axle. Plate 54 is formed with a suitable flange 64 which reinforces the plate against bending though allowing flexure or twisting about the longitudinal axis of suspension arm or rod 38. The forward end of flange 64 is removed to permit rod 38 to extend therethrough and be secured to portion 56 of the plate. Again in the preferred embodiment, it is found satisfactory to secure the radius rod to the plate through suitable weldments 66. To insure sufficient area for welding between one-half to two-thirds of the length of the arm or rod 38 should overlay and be secured to plate 54. While, as illustrated, the main longitudinal extent of the rod 38 is of circular cross-section, such cross-section can also be rectangular.

Once again it should be noted that the subject suspension can be utilized with a unitized or monocoque body which does not employ a conventional chassis. In such case the suspension arm supporting brackets 26, 28 would be mounted to and depend from such body.

Other modifications are possible within the intended scope of the invention as set forth in the hereinafter appended claims.

What is claimed is:

1. A chassis supported suspension of the type wherein the chassis includes a pair of laterally spaced longitudinally extending beams (12, 14), a transverse beam (16) integrally joined to the longitudinal beams, a suspension (18) articulated to the chassis, and a plurality of spring members (60) disposed between the chassis and the suspension, the improvement wherein the suspension comprises an axle (20) extending transversely outboard of the longitudinal beams, said axle having an upper face (24), bracket members (26, 28) respectively secured to the chassis at the junctions of the longitudinal beams and the transverse beam and projecting below the longitudinal beams, a pair of rods (36, 38) each including a journal bearing (40, 44, 46) at one end thereof, each longitudinal beam being superadjacent to one of said rods, bolt means (34) extending through said bracket members and said journal bearings to articulate each rod to one of said bracket members such that each rod may rotate about its associated bolt means in a vertical plane passing through the superadjacent longitudinal beam, a pair of plate elements (52, 54) fixed to the upper face of the axle and extending longitudinally into the space between the axle and the transverse beam, each plate element being subadjacently and longitudinally aligned with one of said longitudinal beams, a portion (68) of each rod remote from its journal bearing being respectively rigidly fixed to one of said plate elements whereby said axle, plate element and rods rotate in unison relative to each rod bracket member and said rods are the sole means for resisting lateral movement of said axle relative to said chassis.

2. A chassis supported suspension of the type set forth in claim 1 wherein each plate element (52, 54) is elongated and includes a first portion (56) extending longitudinally in the space between the axle and the transverse beam, the portion (68) of each rod remote from its respective journal bearing being fixed the first portion of one of said plate elements, each plate element including a second portion (58) extending longitudinally beyond the axle opposite from said first portion of the plate element, one of said spring means (60) seated between the second portion of each plate element and the superadjacent longitudinal beam.

3. A vehicle body supported suspension of the type wherein a suspension (18) is articulated to the body, and a plurality of spring members (60) disposed between the body and the suspension, the improvement wherein the suspension comprises an axle (20), bracket members (26, 28) respectively secured to and depending from the body, said axle extending transversely outboard of said bracket members, a pair of arms (36, 38) each including a journal bearing (40, 44, 46) at one end thereof, each of said arms being respectively aligned with one of said bracket members, bolt means (34) extending through said bracket members and said journal bearings to articulate each arm to one of said bracket members such that each arm may rotate about its associated bolt means, support plates (52, 54) secured to said axle in respective alignment with the bracket members, a substantial portion (68) of the length of arm opposite from the journal bearing rigidly fixed to one of said plates whereby the axle will rotate about said bracket members in unison with the arms and said arms are the sole means for resisting lateral movement of the axle relative to the chassis.

4. A vehicle body suspension as set forth in claim 3 wherein each support plate includes a first portion (56) extending longitudinally in the space between the axle and an aligned bracket member, a substantial portion of the length (68) of each arm being fixed to each first plate portion, each support
    beyond the axle opposite from said first portion, each of said spring members respectively supported between the second portion of one support plate and the superadjacent body.

* * * * *